United States Patent

Stephen

[11] 4,093,586
[45] June 6, 1978

[54] PYRROLIDINE DICARBOXYLIC ACIDS AND ESTERS AND STABILIZED COMPOSITIONS

[75] Inventor: John F. Stephen, New City, N.Y.

[73] Assignee: Ciba-Geigy Corporation, Ardsley, N.Y.

[21] Appl. No.: 668,010

[22] Filed: Mar. 18, 1976

Related U.S. Application Data

[63] Continuation-in-part of Ser. No. 541,373, Jan. 15, 1975, abandoned, which is a continuation-in-part of Ser. No. 429,328, Dec. 28, 1973, abandoned.

[51] Int. Cl.² .................. C08K 5/34; C07D 207/04
[52] U.S. Cl. .................. 260/45.8 N; 260/45.7 P; 260/45.8 NT; 260/45.85 B; 260/326.46
[58] Field of Search .................. 260/326.46, 45.8 N

[56] References Cited

U.S. PATENT DOCUMENTS 3,124,593  3/1964  Cignarella et al. .............. 260/243 C
3,850,877  11/1974  Cook .................. 260/45.8 N
3,959,214  5/1976  Roberts et al. .................. 260/45.8 N

FOREIGN PATENT DOCUMENTS 226,691  4/1963  Austria .......................... 260/326.46

*Primary Examiner*—Nicholas S. Rizzo
*Attorney, Agent, or Firm*—Vincent J. Cavalieri

[57] ABSTRACT

Compounds having the formula

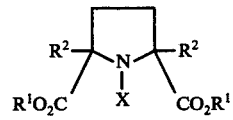

wherein
X is alkyl, hydrogen, hydroxyl, oxygen radical, alkenyl, $CH_2CH_2OCH_3$ or $CH_2C\equiv CH$;
$R^1$ is alkyl or phenethyl; and
$R^2$ is alkyl, are good light stabilizers. These compounds are prepared for example, from acetonlyacetone, an appropriate amine hydrochloride and sodium cyanide to give N-substituted 2,5-dimethyl-2,5-dicyanopyrrolidines which are coverted by standard techniques to the corresponding dicarboxylic acid. These esters are prepared by alkylation of appropriate alkali metal salts.

31 Claims, No Drawings

PYRROLIDINE DICARBOXYLIC ACIDS AND ESTERS AND STABILIZED COMPOSITIONS

This application is a continuation-in-part application of co-pending U.S. patent application, Ser. No. 541,373, filed Jan. 15, 1975, now abandoned, which is a continuation-in-part application of U.S. patent application, Ser. No. 429,328, filed Dec. 28, 1973, now abandoned.

This invention relates to pyrrolidine dicarboxylic acid esters and organic compositions stabilized therewith. More specifically, these compounds are useful as stabilizers of organic materials which are subject to ultraviolet light degradation. The novel compounds of this invention can be represented by the formula

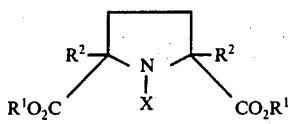

wherein
X is hydrogen, hydroxyl, O, alkyl having 1 to 12 carbons, $CH_2CH_2OCH_3$, alkenyl having 3 or 4 carbons or $CH_2C\equiv CH$;
$R^1$ is hydrogen, alkyl having 1 to 20 carbons or phenethyl;
$R^2$ is the same or different alkyls having 1 to 7 carbons.

The preferred embodiment of the above represented compounds is where $R^2$ is methyl and X is methyl, $CH_2CH_2OCH_3$, $CH_2CH=CH_2$ or $CH_2C\equiv CH$ and most preferably where X is methyl.

A further preferred embodiment of the above represented compounds are those compounds wherein $R^1$ is alkyl having 4 to 20, more preferably 4 to 18, and most preferably 8 to 18, carbon atoms.

A further particularly preferred embodiment of the above represented compounds are those compounds wherein $R^1$ is alkyl having 4 to 20, more preferably 4 to 18, and most preferably 8 to 18, carbon atoms and X is hydrogen or alkyl having 1 to 12 carbon atoms, more preferably alkyl having 1 to 12 carbon atoms, and most preferably methyl. Among these preferred compounds, those are particularly preferred where $R^2$ is lower alkyl of 1 to 4 carbon atoms, especially methyl.

Esters of N-substituted -2,5-dimethylpyrrolidine-2,5-dicarboxylic acid can be prepared by reacting alkali metal salts of N-substituted-2,5-dimethylpyrrolidine-2,5-dicarboxylic acids with the appropriate alkyl halide in a dipolar aprotic solvent such as N,N-dimethylformamide. Suitable alkali metal salts include the potassium, sodium and lithium salts. N-substituted-2,5-dimethylpyrrolidine-2,5-dicarboxylic acids can be prepared by saponifying the appropriate N-substituted 2,5-dimethyl-2,5-dicyanopyrrolidine with, for example, aqueous potassium hydroxide. N-substituted-2,5-dimethyl-2,5-dicyanopyrrolidines can be prepared from acetonylacetone, hydrogen cyanide and the appropriate amine according to the method described in U.S. Pat. No. 2,580,738. By replacing acetonylacetone by an appropriate 1,4-diketone in the above method, the other N-substituted-2,5-dialkyl-2,5-dicyanopyrrolidines of the invention can be prepared. The compounds can also be prepared from acetonlyacetone, sodium cyanide and the appropriate amine hydrochloride.

When methylamine is employed as the amine, N-methyl-2,5-dialkylpyrrolidine-2,5-dicarboxylic acids and the corresponding esters are obtained. When methylamine is replaced by other primary amines such allylamine and 2-methoxyethylamine, the other N-substituted acids and corresponding esters of the invention, such as the N-allyl and N-(2-methoxyethyl) compounds, are obtained.

Esters of N-substituted-2,5-dialkylpyrrolidine-2,5-dicarboxylic acids can be oxidized with hydrogen peroxide to the corresponding nitroxides. These nitroxides can be reduced catalytically to the corresponding hydroxylamines and by further reduction of the hydroxylamines, the corresponding basic amines are obtained. The acids of the nitroxides, hydroxylamines and basic amines can be prepared by hydrolysis of the appropriate esters.

The starting materials in the present invention are either known compounds or can be prepared by methods well known in the art.

Illustrative examples of the compounds of this invention are:

dimethyl N-methyl-2-methyl-5-heptylpyrrolidine-2,5-dicarboxylate
dieicosyl N-methyl-2-methyl-5-heptylpyrrolidine-2,5-dicarboxylate
dimethyl N-methyl-2,5-dibutylpyrrolidine-2,5-dicarboxylate
dieicosyl N-methyl-2,5-dibutylpyrrolidine-2,5-dicarboxylate
dimethyl N-methyl-2,5-diheptylpyrrolidine-2,5-dicarboxylate
dieicosyl N-methyl-2,5-diheptylpyrrolidine-2,5-dicarboxylate
di-n-octyl N-(2-methoxyethyl)-2,5-dimethylpyrrolidine-2,5-dicarboxylate
di-(2-ethylhexyl) N-allyl-2,5-dimethylpyrrolidine-2,5-dicarboxylate
di-n-butyl-N-propargyl-2,5-dimethylpyrrolidine-2,5-dicarboxylate.

The preparation of these compounds is further illustrated in greater detail in the examples below:

EXAMPLE 1

N-methyl-2,5-dimethyl-2,5-dicyanopyrrolidine

A solution of freshly distilled acetonylacetone (114.0 g, 1 mole) in 100 ml of water was added dropwise during 2.5 hours to a stirred mixture of sodium cyanide (122.5 g, 2.5 mole) and methylamine hydrochloride (169.0 g, 2.5 mole) in 500 ml of water. During the addition the temperature was kept at 0°–5° by use of an ice bath. After the addition was completed the mixture was stirred at 0°–5° overnight. The precipitated white solid was collected by filtration and was recrystallized from ether-petroleum ether mixture to give 120.0 g (73.5%) of the title compound, m.p. 81°–83° C.

EXAMPLE 2

N-methyl-2,5-dimethylpyrrolidine-2,5-dicarboxylic acid

N-methyl-2,5-dimethyl-2,5-dicyanopyrrolidine (153.0 g, 0.94 mole) was added to a stirred solution of potassium hydroxide (87%, 145.0 g, 2.25 mole) in 1400 ml of water. The mixture was stirred at room temperature for 1 hour and then heated under reflux for 24 hours. The hot solution was treated with charcoal and then acidified with 182 ml of 38% hydrochloric acid. The precipitated N-methyl-2,5-dimethylpyrrolidine-2,5-dicarboxylic acid of 133.2 g (70.5%) was filtered off. An analytical sample prepared by recrystallization from water had m.p. 260°–268° C dec.

Analysis for $C_9H_{15}NO_4$:
Calculated: C, 53.72; H, 7.51; N, 6.96.
Found: C, 53.40; H, 7.67; N, 7.26.

EXAMPLE 3

Di-n-dodecyl N-methyl-2,5-dimethylpyrrolidine-2,5-dicarboxylate

N-methyl-2,5-dimethylpyrrolidine-2,5-dicarboxylic acid (5.03 g, 0.025 mole) was dissolved in 50 ml* methanol solution. Evaporation of the methanol under reduced pressure furnished the di-potassium salt which was heated at ~60°/0.01 mm for several hours. The salt was suspended in 100 ml of dry dimethylformamide, 1-bromododecane (13.0 g, 0.05 mole) added and the mixture was stirred and heated at 85°–90° for 18 hours. The solvent was evaporated in vacuo and the residue thus obtained was dissolved in ether.
*of 1N potassium hydroxide After filtration the ether was evaporated and the resulting oil was chromatographed on silica gel using benzene as solvent to give pure di-n-dodecyl N-methyl-2,5-dimethylpyrrolidine-2,5-di-carboxylate, (8.1 g, 60%) as a pale yellow oil.

Analysis for $C_{36}H_{69}NO_4$:
Calculated: C, 73.69; H, 11.81; N, 2.60.
Found: C, 73.97; H, 11.84; N, 2.55.

EXAMPLE 4

2,5-dimethyl-3,5-dicarbomethoxypyrrolidine-1-oxyl

30% aqueous hydrogen peroxide (524 ml) was added dropwise during 45 minutes to a stirred mixture of dimethyl N-methyl-2,5-dimethylpyrrolidine-2,5-dicarboxylate (60.0 g, 0.262 mole), sodium tungstate (2.4 g), Trilon B (2.6 g) and water (100 ml) at 0°. After the addition was completed, the mixture was stirred at 0°–5° for 4 hours and then allowed to warm to room temperature. After 8 days the yellow solution was saturated with sodium chloride and the orange oil which separated was extracted with methylene chloride. The methylene chloride solution was washed with dilute hydrochloric acid and brine. The dried ($Na_2SO_4$) solution was evaporated under reduced pressure to give 47.0 g of an orange solid. A 23-gram sample of this material was chromatographed on 460 g of silica gel using chloroform-ethyl acetate (95:5) as solvent to give 19.0 g of pure nitroxide, m.p. 30°.

Analysis for $C_{10}H_{16}NO_5$:
Calculated: C, 52.16; H, 7.01; N, 6.08.
Found: C, 52.27; H, 7.26; N, 6.11.

EXAMPLE 5

2,5-dimethyl-2,5-dicarbomethoxy-n-hydroxy-pyrrolidine

A solution of 2,5-dimethyl-2,5-dicarbomethoxypyrrolidine-1-oxyl (5.0 g, 0.0218 mole) in 100 ml of ethanol was hydrogenated over 10% Pd/C (100 g) in a Parr apparatus at 50 psi. Hydrogen uptake was complete after 30 minutes. The catalyst was removed by filtration and the filtrate was evaporated under reduced pressure to give a pale yellow oil. Distillation in vacuo gave the title compound 3.0 g (60%) as the fraction b.p. 83.5°–85.5°/0.02 mm.

Analysis for $C_{10}H_{17}NO_4$:
Calculated: C, 51.94; H, 7.41; N, 6.06.
Found: C, 51.67; H, 7.63; N, 5.88.

The compounds listed in Table I below were prepared according to the procedure of Example 3.

TABLE I
ESTERS OF PYRROLIDINE DICARBOXYLIC ACIDS

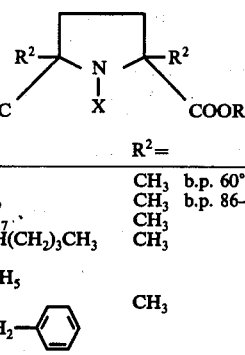

| Ex. No. | X= | R¹= | R²= | |
|---|---|---|---|---|
| 6 | $CH_3$ | $CH_3$ | $CH_3$ | b.p. 60° C/0.04 mm |
| 7 | $CH_3$ | $n-C_4H_9$ | $CH_3$ | b.p. 86–88° C/0.02 mm |
| 8 | $CH_3$ | $n-C_8H_{17}$ | $CH_3$ | * |
| 9 | $CH_3$ | $CH_2\overset{|}{\underset{C_2H_5}{CH}}(CH_2)_3CH_3$ | $CH_3$ | * |
| 10 | $CH_3$ | $CH_2CH_2$— | $CH_3$ | * |
| 11 | $CH_3$ | $n-C_{18}H_{37}$ | $CH_3$ | m.p. 45–57° C |

* Oil, purified by chromotography over silica gel. The micronanalytical results for hydrogen, carbon and nitrogen corresponded to the calculated values.

The compounds of this invention are stabilizers of organic material normally subject to thermal, oxidative or acitinic light deterioration. Materials which are thus stabilized include synthetic organic polymeric substances including homopolymers, copolymers, and mixtures thereof, such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as high and low density polyethylene, cross-linked polyethylene, polypropylene, poly(4-methylpentene-1 and the like, including copolymers of α-olefins; such as ethylene-propylene copolymers, and the like; dienes such as polybutadiene, polyisoprene, and the like, including copolymers with other monomers; polyurethanes such as are prepared from polyols and organic polyisocyanates, and polyamides such as polyhexamethylene adipamide and polycaprolactam; polyesters such as polyethylene terephthalates; polycarbonates such as those prepared from bisphenol-A and phosgene; polyacetals such as polyethylene terephthalate polyacetal; polystyrene, polyethyleneoxide; polyacrylics such as polyacrylonitrile; polyphenyleneoxides such as those prepared from 2,6-dimethylphenol and the like; and copolymers such as those of polystyrene containing polymers of butadiene and styrene and those formed by the copolymerization of acrylonitrile, butadiene and/or styrene.

Other materials which can be stabilized by the compounds of the present invention include lubricating oil of the aliphatic ester type, i.e., di(1,2-ethylene)azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like; and alkylene glycols, e.g., β-methoxyethyleneglycol, methoxytriethyleneglycol, triethylene glycol, octaethyleneglycol, dibutyleneglycol, dipropyleneglycol and the like.

The compounds of this invention are particularly useful as UV light stabilizers, especially for the protection of polyolefins, for instance, polyethylene, polypropylene, poly(butene-1), poly(pentene-1), poly (3-methylbutene-1), poly(4-methylpentene-1), various ethylene-propylene copolymers and the like.

In general, the stabilizers of this invention are employed from about 0.01 to about 5% by weight of the stabilized composition, although this will vary with the particular substrate and application. An advantageous range is from about 0.05 to about 2% and especially 0.1 to about 1%.

For addition to polymeric substrates, the stabilizers can be blended before polymerization or after polymerization, during the usual processing operations, for example, by hot-milling, the composition then being extruded, pressed, blow molded or the like into films, fibers, filaments, hollow spheres and the like. The heat stabilizing properties of these compounds may advantageously stabilize the polymer against degradation during such processing at the high temperature generally encountered. The stabilizers can also be dissolved in suitable solvents and sprayed on the surface of films, fabrics, filaments or the like to provide effective stabilization. Where the polymer is prepared from a liquid monomer as in the case of styrene, the stabilizer may be dispersed or dissolved in the monomer prior to polymerization or curing.

These compounds can also be used in combination with other additives such as antioxidants, sulfur-containing esters such as distearyl-$\beta$-thiodipropionate (DSTDP), dilauryl-$\beta$-thiodipropionate (DLTDP) in an amount of from 0.01 to 2% by weight of the organic material, and the like, pourpoint depressants, corrosion and rust inhibitors, dispersing agents, demulsifiers, antifoaming agents, fillers such as glass or other fibers, carbon black, accelerators and the other chemicals used in rubber compounding, plasticizers, color stabilizers, di- and tri-alkyl- and -alkylphenyl-phosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

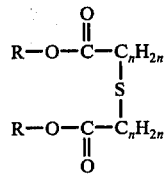

wherein R is an alkyl group having from 6 to 24 carbon atoms; and $n$ is an integer from 1 to 6. Especially useful compounds of this type are dilauryl-$\beta$-thiodipropionate and distearyl-$\beta$-thiodipropionate. The above co-stabilizers are used in the amount of from 0.01 to 2% by weight of the organic material, and preferably from 0.1 to 1%.

Although the compounds of this invention may to some degree also be effective as thermal stabilizers, if the processing of the polymer is carried out at high temperatures it is advantageous to incorporate additional antioxidants.

In most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.0005% to 5% and preferably from 0.01% to 2% by weight. Representative of such antioxidants are phosphite esters, such as triphenylphosphite and dibutylphosphite and alkyl arylphosphites such as dibutylphenylphosphite, and the like.

The best results have been obtained with the preferred class of thermal antioxidants, the hindered phenols. These compounds have been found to provide the best thermal stabilization with the least discoloration in the compositions of the invention. Among these phenolic antioxidants are included the following:

di-n-octadecyl(3,5-butyl-4-hydroxy-5-methylbenzyl) malonate
2,6-di-t-butylphenol
2,2'-methylene-bis(6-t-butyl-4-methylphenol)
2,6-di-t-butylhydroquinone
octadecyl-(3,5-di-t-butyl-4-hydroxybenzyl-thio) acetate
1,1,3-tris(3-t-butyl-6-methyl-4-hydroxyphenyl)-butane
1,4-bis(3,5-di-t-butyl-4-hydroxybenzyl)-2,3-5,6-tetramethylbenzene
2,4-bis-(3,5-di-t-butyl-4-hydroxyphenoxy)-6-(n-octylthio)-1,3,5-triazine
2,4-bis-(4-hydroxy-3,5-di-t-butylphenoxy)-6-(n-octylthioethylthio)-1,3,5-triazine
2,4-bis-(n-octylthio)-6-(3,5-di-t-butyl-4-hydroxyanilino)-1,3,5-triazine
2,4,6-tris-(4-hydroxy-3,5-di-t-butylphenoxy)-1,3,5-triazine
n-octadecyl-$\beta$-(3,5-di-t-butyl-4-hydroxyphenyl)propionate
n-octadecyl-3,5-di-t-butyl-4-hydroxybenzoate
2-(n-octylthio)ethyl-3,5-di-t-butyl-4-hydroxy benzoate
stearamido N,N-bis-[ethylene 3-(3,5-di-t-butyl-4-hydroxyphenyl)propionate]
1,2-propylene glycol bis-[3-(3,5-di-t-butyl-4-hydroxyphenyl)propionate]
pentaerythritol tetrakis-[3-(3,5-di-t-butyl-4-hydroxyphenyl)propionate]
dioctadecyl-3,5-di-t-butyl-4-hydroxybenzylphosphonate
di-n-octadecyl-1-(3,5-di-t-butyl-4-hydroxy-phenyl)-ethanephosphonate The above phenolic hydrocarbon stabilizers are known and many are commercially available.

The above antioxidants have been listed only for the purpose of illustration and it is important to note that any other antioxidant can be employed with similar improved results. The above exemplified antioxidants and other related antioxidants which are incorporated herein by reference, are disclosed in greater detail in the following patents:

Netherlands Patent Specification No. 67/1119, issued Feb. 19, 1968; Netherlands Patent Specification No. 68/03498, issued Sept. 18, 1968; U.S. Pat. Nos. 3,255,191; 3,330,859, 3,644,482, 3,281,505; 3,531,483, 3,285,855; 3,364,250; 3,368,997; 3,357,944 and 3,758,549.

Artificial Light Exposure Test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an artificial light exposure device is described below:

(a) Sample Preparation 5 mil Film — Unstabilized polypropylene powder (Hercules Profax 6501) is thoroughly blended with the indicated amounts of additives. The blended material is then milled on a two roll mill for 5 minutes at 182° C. The milled sheet is then compression molded at 220° C into 5 mil thick film under a pressure of 175 psi and water cooled in the press.

(b) Testing Method

This test is conducted in a FS/BL unit, basically of the American Cyanamid design, which consists of 40 tubes of alternating fluorescent sunlamps and black lights (20 of each). The 5 mil sample film which are mounted on 3 × 2 IR card holders with ¼ × 1 windows and are placed on a rotating drum 2 inches from the bulbs in the FS/BL unit. The time in hours is noted for the development of 0.5 carbonyl absorbance units as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight percent based on the weight of the polymer.

TABLE II

LIGHT STABILIZATION DATA IN POLYPROPYLENE
Time in Hours to 0.5 Carbonyl Absorbance Units

| Ex. No. | Stabilizer | Formulation A* | Formulation B** |
|---|---|---|---|
| 12 | None | 230 | 555 |
| 13 | Compound of Ex. 6 | 340 | 630 |
| 14 | Compound pf Ex. 7 | 555 | 940 |
| 15 | Compound of Ex. 8 | 1095 | 2710 |
| 16 | Compound of Ex. 9 | 865 | 2340 |
| 17 | Compound of Ex. 10 | 670 | 1555 |
| 18 | Compound of Ex. 3 | 1045 | 2715 |
| 19 | Compound of Ex. 11 | 855 | 1830 |
| 20 | Compound of Ex. 4 | 250 | 555 |
| 21 | Compound of Ex. 5 | 275 | 735 |

*Formulation A contains 0.5% of the indicated stabilizer and 0.2% of the antioxidant di-n-octadecyl-3,5-di-tert-butyl-4-hydroxybenzylphosphonate.
**Formulation B contains 0.25% of the indicated stabilizer, 0.2% of the antioxidant di-n-octadecyl 3,5-di-tert-butyl-4-hydroxybenzylphosphonate and 0.25% of UV absorber 2(2'-hydroxy-3',5'-di tert-butylphenyl)-5-chlorobenzotriazole.

When polypropylene is tested under similar conditions as in Table II with the above-noted stabilizers employing 0.1, 0.5 and 1.0% concentrations but employing the following antioxidants:

(a) di-n-octadecyl (3-t-butyl-4-hydroxy-5-methylbenzyl)malonate
(b) 2,4-bis-(4-hydroxy-3,-5-di-t-butylphenyl)-6-(n-octylthioethylthio)-1,3,5-triazine
(c) n-octadecyl β-(3,5-di-t-butyl-4-hydroxy-phenyl)-propionate
(d) pentaerythritol tetrakis-[3-(3,5-di-t-butyl-4-hydroxyphenyl)propionate]

comparably good light stabilization is obtained.

Other hindered phenolic antioxidants may be used in place of di-octadecyl(3,5-di-t-butyl-4-hydroxy-benzyl)-phosphonate in the above mentioned compositions for example, di-n-octadecyl α-(3-t-butyl-4-hydroxy-4-methylbenzyl) malonate, 2,4-bis(n-octylthio)-6-(3,4-di-t-butyl-4-hydroxy-aniline)-1,3,5-triazine, octadecyl 3-(3',5'-di-t-butyl-4'-hydroxyphenyl)propionate, pentaerthritol-tetrakis[3-(3,5-di-t-butyl-4-hydroxyphenyl)]propionate, tris-(3,5-di-t-butyl-4-hydroxybenzyl)isocyanurate, 2,6-di-tert-butyl-4-methylphenol, N,N,N-tris-(3,5-di-tert-butyl-4-hydroxybenzyl) isocyanurate, and 2,4,6-tris(3,5-di-tert-butyl-4-hydroxy-benzyl)-1,3,5-trimethylbenzyl.

The compositions of Table I are also stabilized with 2(2'-hydroxy-3', 5'-di-t-butylphenyl)-5-chlorobenzotriazole is replaced with the following UV absorbers:

(a) 2-hydroxy-4-methoxy-5-sulfobenzophenone trihydrate
(b) 2-hydroxy-4-n-octoxybenzophenone
(c) [2,2'-thiobis(4-t-octylphenolate)]-n-butylamine nickel II
(d) p-octylphenyl salicylate
(e) 2,2'-dihydroxy-4,4'-dimethoxybenzophenone
(f) 2(2'-hydroxy-5'-methylphenyl)-benzotriazole.

What is claimed is:

1. A compound having the formula

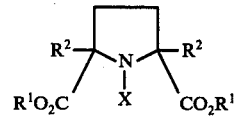

wherein
X is hydrogen, hydroxyl, O, alkyl having 1 to 12 carbons, $CH_2CH_2OCH_3$, alkenyl having 3 to 4 carbons or $CH_2C\equiv CH$;
$R^1$ is hydrogen, alkyl having 1 to 20 carbons or phenethyl; and
$R^2$ are the same or different alkyls having 1 to 7 carbons.

2. A compound of claim 1 wherein $R^1$ is hydrogen.
3. A compound of claim 1 wherein $R^1$ is alkyl or phenethyl.
4. A compound of claim 1 wherein $R^1$ is alkyl having 4 to 20 carbon atoms.
5. A compound of claim 3 wherein $R^2$ is methyl.
6. The compound of claim 1 which is N-methyl-2,5-dimethylpyrrolidine-2,5-dicarboxylic acid.
7. The compound of claim 1 which is di-n-dodecyl N-methyl-2,5-dimethylpyrrolidine-2,5-dicarboxylate.
8. The compound of claim 1 which is 2,5-dimethyl-2,5-dicarbomethoxypyrrolidine-1-oxyl.
9. The compound of claim 1 which is 2,5-dimethyl-3,5-dicarbomethoxy-N-hydroxy-pyrrolidine.
10. The compound of claim 1 which is dimethyl N-methyl-2,5-dimethylpyrrolidine-2,5-dicarboxylate.
11. The compound of claim 1 which is di-n-butyl N-methyl-2,5-dimethylpyrrolidine-2,5-dicarboxylate.
12. The compound of claim 1 which is di-n-octyl N-methyl-2,5-dimethylpyrrolidine-2,5-dicarboxylate.
13. The compound of claim 1 which is di(2-ethylhexyl)-N-methyl-2,5-dimethylpyrrolidine-2,5-dicarboxylate.
14. The compound of claim 1 which is diphenethyl N-methyl-2,5-dimethylpyrrolidine-2,5-dicarboxylate.

15. The compound of claim 1 which is di-n-octadecyl N-methyl-2,5-dimethylpyrrolidine-2,5-dicarboxylate.

16. A composition of matter stabilized against degradation which comprises a synthetic organic polymer subject to ultraviolet light degradation and a compound of claim 1.

17. A composition of claim 16 wherein $R^1$ is hydrogen.

18. A composition of claim 16 wherein $R^1$ is alkyl or phenethyl.

19. A composition of claim 16 wherein $R^1$ is alkyl having 4 to 20 carbon atoms.

20. A composition of claim 18 wherein $R^2$ is methyl.

21. A composition of claim 16 wherein the stabilizer is di-n-octyl N-methyl-2,5-dimethylpyrrolidine-2,5-dicarboxylate.

22. A composition of claim 16 wherein the stabilizer is di(2-ethylhexyl) -N-methyl-2,5-dimethylpyrrolidine-2,5-dicarboxylate.

23. A composition of claim 16 wherein the stabilizer is di-n-dodecyl N-methyl-2,5-dimethylpyrrolidine-2,5-dicarboxylate.

24. A composition of claim 16 wherein the stabilizer is di-n-octadecyl N-methyl-2,5-di-methylpyrrolidine-2,5-dicarboxylate.

25. A composition of claim 16 wherein the synthetic organic polymer is a polyolefin.

26. A composition of claim 25 wherein the polyolefin is polypropylene.

27. A composition of claim 25 which contains additionally 0.01 to 2% of a compound of a formula

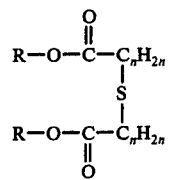

wherein R is an alkyl group having from 6 to 24 carbon atoms and n is an integer from 1 to 6.

28. A composition of claim 25 which contains additionally 0.005 to 5% of a hindered phenolic antioxidant.

29. A composition of claim 25 which contains additionally 0.005 to 5% of a hindered phenolic antioxidant and a stabilizing amount of a UV absorber.

30. A composition of claim 28 which contains additionally 0.005 to 5% of a phenolic antioxidant selected from n-octadecyl β(3,5-di-t-butyl-4-hydroxyphenyl)-propionate, di-n-octadecyl-3,5-di-tert-butyl-4-hydroxybenzyl-phosphonate, pentaerythritol tetrakis-[3-(3,5-di-t-butyl-4-hydroxyphenyl)propionate], and tris-(3,5-di-t-butyl-4-hydroxybenzyl)isocyanurate.

31. A composition of claim 29 which contains additionally
(a) 0.005 to 5% of a phenolic antioxidant selected from n-octadecyl β--(3,5-di-t-butyl-4-hydroxyphenyl)propionate, di-n-octadecyl-3,5-di-tert-butyl-4-hydroxybenzyl-phosphonate, pentaerythritol tetrakis-[3-(3,5-di-t-butyl-4-hydroxyphenyl)propionate], and tris-(3,5-di-t-butyl-4-hydroxybenzyl)isocyanurate, and
(b) a stabilizing amount of a UV absorber selected from 2(2'-hydroxy-3',5'-di-tert-butylphenyl)-5-chlorobenzotriazole, 2-hydroxy-4-n-octoxybenzophenone, and 2(2'-hydroxy-5'-methylphenyl)-benzotriazole.

* * * * *